Figure 1:
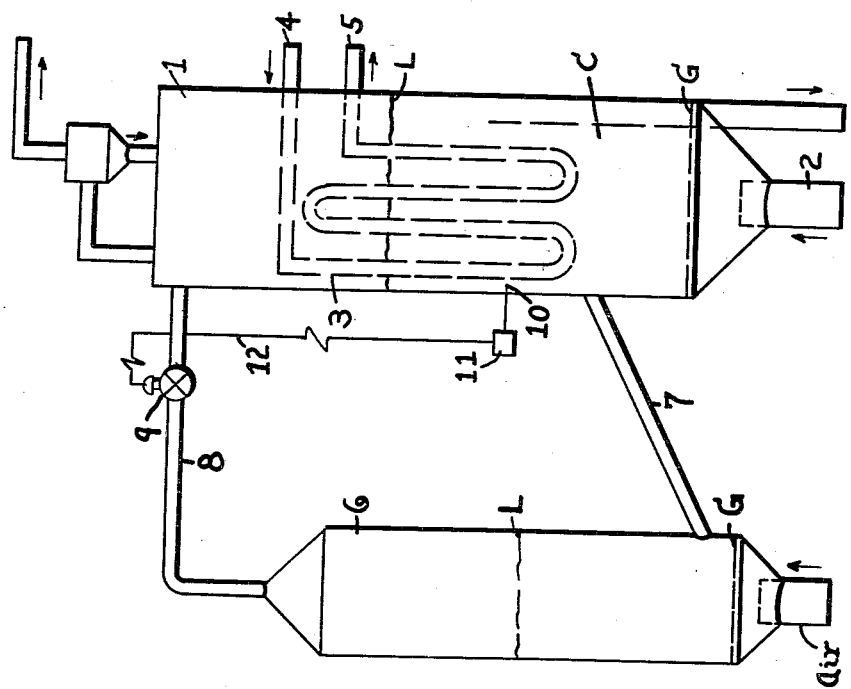

Jan. 15, 1957

L. A. NICOLAI 2,777,804

REGENERATOR TEMPERATURE CONTROL

Original Filed May 21, 1952

Lloyd A. Nicolai   Inventor

By J. Cashman  Attorney

United States Patent Office 2,777,804
Patented Jan. 15, 1957

2,777,804
REGENERATOR TEMPERATURE CONTROL

Lloyd Arthur Nicolai, Baton Rouge, La., assignor to Esso Research and Engineering Company, a corporation of Delaware Continuation of application Serial No. 289,121, May 21, 1952. This application December 23, 1954, Serial No. 477,377

2 Claims. (Cl. 196—50)

This is a continuation of application Serial No. 289,121, filed May 21, 1952, by Lloyd A. Nicolai for "Improved Regenerator Temperature Control," now abandoned.

The present invention relates to improvements in the regeneration of a catalyst which has become contaminated with deposits during use in a process and, therefore, requires periodic regeneration to restore its activity. More particularly, the present invention relates to regenerating a powdered catalyst which is employed in a process utilizing the fluidized catalyst technique.

In a copending application Serial No. 192,471, filed in the name of Walter A. Rex on October 27, 1950, for "Method of and Apparatus for Controlling Regenerator Temperatures," there is described and claimed a method for abstracting heat from the regeneration zone of a two vessel fluid hydroforming system by varying the degree of immersion of cooling means in the fluidized bed of catalyst in said zone responsive to temperature conditions in said zone. The aforesaid Rex application has been abandoned in favor of continuation application Ser. No. 477,434, filed December 23, 1954, now U. S. Patent No. 2,735,744, dated February 21, 1956.

It is well known, of course, that regenerating a solid catalyst with air or other oxygen containing gas may injure the catalyst due to overheating unless care is taken to prevent such injury. For example, when regenerating a hydroforming catalyst such as a group VI metal oxide carried on alumina, with air, it is necessary that the temperature of regeneration does not exceed 1100° to 1200° F., for temperatures above this level will impair catalyst activity and may permanently deactivate the catalyst.

Heretofore, and prior to this invention, it was common practice in regenerating a catalyst by means of a regeneration gas containing oxygen to abstract heat from the catalyst by various cooling means. For example, cooling tubes through which a coolant was circulated were disposed in the bed of catalyst undergoing regeneration to abstract heat from the hot bed.

It is pointed out that certain relationships are referred to in this present fluid hydroforming art. One of these is the catalyst to oil ratio. This has reference to the amount of catalyst expressed, say, in pounds fed to the reactor for each unit (pound) of oil fed to the reactor. Another relationship in the present art is the oil feed rate which is usually expressed as units (pounds) of oil feed to the reactor per unit (pound) of catalyst in the reactor per hour. The difference between the two is, of course, that the first has to do with the catalyst circulation rate between the reactor and the regenerator, and the second has to do with the contact or residence time of the oil in the reactor. Both influence the results obtained.

With respect to the present invention, means are provided for controlling regenerator temperatures while maintaining the catalyst circulation rate from the regenerator to the reactor at a substantially constant value in contradistinction to previous practice in which, if the regenerator temperature got too high, this rate was increased. With no excess air over and above that previously fed to the regenerator, this method will serve to reduce the generator temperature but has the drawback that excess carbonaceous material is carried into the reactor. This result has the effect of reducing the activity of the catalyst since insufficient air will now be present to burn off this excess carbonaceous material. Hence, the catalyst is returned to the reactor not completely regenerated and thus partially deactivated.

The present invention is an improvement over prior practice in that it provides a means for controlling the catalyst temperature during regeneration without, however, varying the catalyst circulation rate between the reaction zone and the regeneration zone in a system employing the fluidized catalyst technique. In other words, where a powdered catalyst, say, a powdered hydroforming catalyst, is employed in the form of dense fluidized beds in a two vessel system comprising a reaction zone and a regeneration zone, each containing a fluidized bed of catalyst, the process operates more efficiently if the catalyst circulation rate between the said zones is held substantially constant.

In the two vessel fluid hydroforming process in which the catalyst is in the form of fluidized beds in both vessels, when excess heat is liberated in the regenerator over and above that which can be carried back to the reactor as sensible heat of the catalyst, it has been proposed previously that the regenerator temperature be controlled by cooling coils immersed in the catalyst in the regenerator. These coils extended from the dense phase of catalyst into the disperse phase immediately above, and the regenerator temperature was previously controlled by adding or removing catalyst from the reactor so as to submerge more or less of the cooling coils in the dense bed of the regenerator. Inasmuch as the coefficient of heat transfer in the dense catalyst bed is several times that in a disperse phase, the amount of heat transferred to the cooling coils from the catalyst bed depends upon the amount of cooling surface submerged in the dense phase of the bed.

It has now been found that this method of controlling the temperature of a catalyst undergoing regeneration has a major defect in that, if the regeneration temperature is too high and a greater catalyst circulation rate from the reactor to the regenerator is effected so as to submerge more cooling surface, this catalyst carries more carbon into the regenerator, and temporarily, if the normal 10% of excess air is present, a very high regenerator temperature is reached before the heat caused by the burning of the excess carbon is dissipated. Of course, the resulting high temperatures are harmful both from the standpoint of equipment design and the loss of catalyst activity because of overheating of the catalyst. If the catalyst level in the regenerator is varied by changing the rate of catalyst circulation from the regenerator, rather than changing the catalyst circulation rate to the regenerator, the heat control problem is corrected. However, this method of controlling regeneration temperatures has the drawback that the process conditions in the reactor, namely, the catalyst to oil ratio in the reactor, i. e., the contact time, as well as the reactor temperature, are changed and, of course, this is an unsatisfactory condition. It is unsatisfactory because the system is thrown out of balance so that catalyst activity and yields of high octane product are adversely effected. Thus, in a two vessel fluid hydroforming system, it is desirable to set or maintain the operating conditions including temperature, pressure, the catalyst circulation rate between the regenerator and the reactor and catalyst to oil ratio in the reactor at substantially constant values.

It has now been found that the temperature conditions in the regenerator can be controlled by varying the cooling surface submergence in the dense fluidized catalyst bed without varying process conditions in the reactor.

It is the main object of the present invention to regenerate a powdered catalyst with an oxygen-containing gas in a system comprising a reaction zone and a catalyst regeneration zone in which fouled catalyst is withdrawn from the reaction zone and charged to the regeneration zone and regenerated catalyst is returned to the reaction zone while the catalyst is in the form of dense fluidized beds in both zones, without changing the rate at which catalyst is circulated between the zones.

Another object of the present invention involves improvements in a two vessel system employing fluidized catalyst technique, the system comprising a reaction zone and a regeneration zone, where the catalyst circulates between the two zones and wherein by varying the height of the dense phase of the catalyst bed in the regenerator responsive to cooling surface requirements for effecting the desired heat removal from the catalyst without, however, changing the rate of catalyst circulation between the reactor and regenerator.

Other and further objects of the invention will appear from the following more detailed description and claims.

Figure 2:
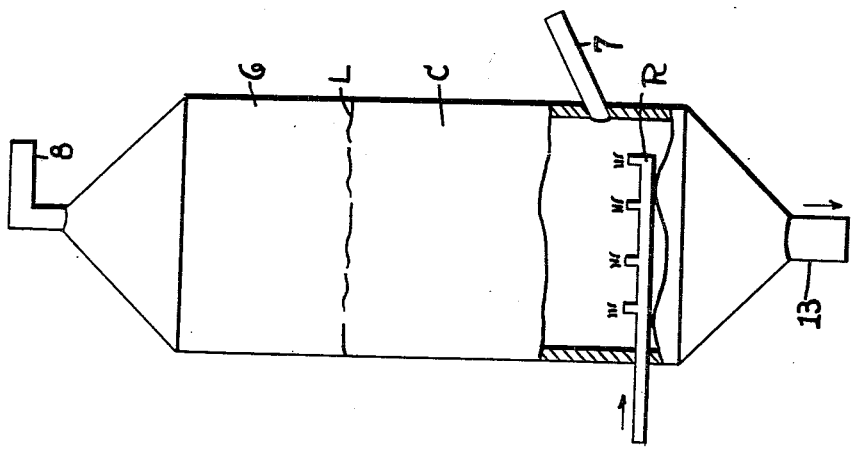

In the accompanying drawings there is shown, diagrammatically, in Figure 1 an apparatus in which the present invention may be carried into effect; and in Figure 2 there is shown a modification of a portion of the apparatus shown in Figure 1.

Similar reference characters refer to similar parts throughout the views.

Referring to detail to Figure 1, 1 represents a regeneration vessel which contains a body of fouled catalyst C which is in the form of a dense fluidized bed or mass extending from a grid or other gas distributing means G to an upper dense phase level L. This catalyst has been withdrawn from a reaction zone (not shown) because it contains a carbonaceous deposit and, therefore, requires regeneration. The catalyst is charged to the bottom of the regenerator 1 suspended in an air stream 2 and thereafter passes through the grid G into the aforesaid bed C. The superficial velocity of the gas is controlled responsive to the particle size distribution of the catalyst so as to maintain the bed in the desired fluidized state. In the case of a hydroforming catalyst, say, 10% $MoO_3$ by weight on 90 weight percent alumina, the latter being a carrier, the particle size distribution would be substantially within the following ranges:

| | Percent by weight |
|---|---|
| 0–20 microns | 0–15 |
| 20–40 microns | 10–30 |
| 40–80 microns | 30–50 |
| 80–200 microns | 15–60 |

The superficial velocity of the gasiform material would be in the range of from 0.5 to 1.5 ft./sec., approximately. With other catalyst (e. g. iron catalysts, oil cracking gel catalysts, etc.) both the particle size and the gas velocities would vary somewhat from those given, but the art has by now become apprised of what these values should be with respect to most catalysts, in order to achieve the dense fluidized bed.

In the case of regenerating a hydroforming catalyst, the same would be charged to the regenerator at an elevated temperature, say, a temperature within the range of about 850° to 950° F. Under the influence, however, of the air which burns the carbonaceous deposits formed on the catalyst during the on-stream hydroforming phase, the temperature of the catalyst is increased by the heat of combustion of said carbonaceous deposits. In order to prevent over-heating of the catalyst, a cooling coil 3 is disposed in the reactor, partially submerged in the dense phase but extending at its upper end into the dilute phase suspension of catalyst in gasiform material which extends from L to the top of the regenerator. A coolant, such as water, is charged to the cooling coils through inlet pipe 4, is thereafter forced through the coils and withdrawn through outlet pipe 5.

If it develops that due to desired process conditions, the catalyst acquires a temperature during the regeneration in excess of 1200° F., the level L of the dense phase is raised by means about to be described.

The present invention provides for an auxiliary vessel 6 which also contains a dense fluidized bed of regenerated catalyst which extends from a grid or rather from a foraminous member G to an upper dense phase level L. This auxiliary vessel 6 is in communication with regenerator 1 at a lower point by means of line 7 and its upper portion by means of a valved line 8.

As indicated in Figure 1, vessel 6, the purpose, of course, charged to the bottom of vessel 6, the purpose, of course, being to maintain the catalyst in vessel 6 in a fluidized state as it is present in regenerator 1. The entering air passes through G and into the bed of catalyst, the superficial velocity of this gas being controlled so as to cause the catalyst to be fluidized, according to known procedure, or as indicated above.

Valve 9 in line 8 in normal position is, of course, partially open so that gas can escape from vessel 6 through line 8 to the top of vessel 1 and pass from the regenerator 1 with the regeneration fumes. This vessel 6 may operate as a stripper wherein the air, or other fluidizing medium, serves to dislodge adsorbed regeneration fumes from freshly regenerated catalyst as the said air moves through the catalyst bed.

If the temperature in the dense fluidized bed of catalyst C becomes too high, then control valve 9 in line 8 is operated so as to restrict the escape of gas, thus increasing the gas pressure in vessel 6 sufficiently to force catalyst from said vessel 6 through line 7 into the bed of catalyst C in regenerator 1, which thus causes the upper dense phase level to rise and with it a greater portion of the cooling coil 3 is submerged in the dense fluidized bed of catalyst, and as a result of the foregoing transfer of catalyst to the regenerator more cooling surface is provided between the dense bed of catalyst and the cooling coil. The result is that there is a greater transfer of heat from the bed of catalyst to the cooling surfaces and the catalyst bed is cooled to the desired temperature.

Conversely, if the temperature of the catalyst in the regenerator falls to a substantially lower temperature than is permissible, valve 9 is operated to decrease the pressure in vessel 6 and catalyst is forced from the regenerator via line 7 and passed to auxiliary vessel 6, thus decreasing the amount of catalyst in the dense phase suspension C exposed to the cooling surface.

As indicated, diagrammatically, in the drawing, means are provided for operating valve 9 automatically responsive to temperature conditions prevailing in regenerator 1 as follows: A thermocouple 10 is disposed in the bed of catalyst C which thermocouple is in communication with means 11 adapted to impart energy to conduit means 12 to actuate valve 9 to urge the said valve into opened or closed position, wholly or partly, responsive to temperature conditions in vessel 1. These automatic temperature controls are available commercially and need not be described in detail as to structure or mode of operation herein, as these means do not go to the heart of the present invention.

In the interest of simplicity there is shown in the drawing only sufficient apparatus to illustrate the novelty of the present invention. As previously indicated, of course, the invention has particular utility in connection with two vessel systems comprising a fluidized catalyst containing reaction vessel and a catalyst regeneration vessel. The art is, however, fully cognizant of how such systems are constructed and operated and, therefore, it is believed unnecessary to include a showing of both vessels and the conventional auxiliary equipment forming a part of such systems.

By similar means heat may be added to or removed from a reactor; i. e., by providing an auxiliary vessel containing hot solids (i. e., catalyst) in communication with the reactor in a manner similar to the arrangement described previously. Thus, in the hydrocarbon synthesis process which is highly exothermic, cool catalyst in an auxiliary vessel may be forced into the reactor to control the temperature therein and prevent overheating of the catalyst in said reactor.

Figure 2, as previously stated, shows a modification of the auxiliary vessel 6 so arranged and adapted as to permit stripping of the catalyst as well as controlling temperature as described previously and illustrated in Figure 1. The stripping gas enters at the bottom of vessel 6 through a distributing ring R or any standard gas distributing device, and the velocity of the gas passing up through the bed of catalyst C is controlled at a velocity so as to maintain the bed in a well fluidized state with an upper dense phase level L. Catalyst is withdrawn from the bottom of vessel 6 through line 13 and returned to the reaction vessel by known means. The operation of the auxiliary vessel 6 of Figure 2 in maintaining the desired temperature in regenerator 1 is the same as previously described in connection with the operation of the apparatus of Figure 1.

In order further to explain the present invention, there is set forth below in the form of a specific example details of operating the present invention. In this example, a comparison is made to show the effect of varying the cooling coil immersion in the dense phase catalyst suspension on the heat transfer rate.

A virgin naphtha was subjected to hydroforming in a two vessel system comprising a reactor and regenerator. The catalyst employed was a molybdenum oxide catalyst carried on active alumina, the molybdenum oxide ($MoO_3$) constituting about 10 wt. percent of the total catalyst. The conditions in the reactor were as follows:

Average temperature_____°F____ 950
Pressure_____p. s. i.__ 200
Feed rate in lbs. of catalyst per lb. of oil per hr__ 4
Cu. ft. of hydrogen fed to reactor per bbl. of oil fed_____ 4000
Concentration of hydrogen_____percent__ 65

When this catalyst became contaminated, it was passed to a regenerator represented by vessel 1 herein and regenerated with air in sufficient amount to burn the deposits under the following conditions. The amount of carbonaceous material on the catalyst may be determined readily by a carbon, hydrogen analysis, and the amount of air necessary to burn the carbonaceous material is thus easily calculated. In the tables following, attention is directed to the large increase in heat transfer when the cooling surfaces are deeply immersed in the dense phase catalyst suspension as compared to the heat transfer when the cooling surfaces are immersed in the dense phase to a lesser degree.

|  | High Cooling Load Regenerator Vessel 1 | Auxiliary Vessel 6 |
|---|---|---|
| Vessel Top Pressure | 200 p. s. i. g | 205 p. s. i. g. |
| Vessel Temperature | 1,150° F |  |
| Percentage of Regenerator Cooling Surface in Dense Phase. | 75 |  |
| Percentage of Regenerator Cooling Surface in Disperse Phase. | 25 |  |
| Overall Heat Transfer Coefficient for Cooling Surface in Dense Phase. | 120 B. t. u./hr.-sq. ft.-°F. |  |
| Overall Heat Transfer Coefficient for Cooling Surface in Disperse Phase. | 20 B. t. u./hr. sq. ft.-°F. |  |
| Average Heat Transfer Coefficient for Total Fixed Cooling Surface. | 95 B. t. u./hr.-sq. ft.-°F. |  |
| Average Coolant Temperature | 350° F |  |
| Average ΔT | 800° F |  |
| Average Heat Transferred Per Sq. Ft. of Total Fixed Cooling Surface. | 76,000 B. t. u./hr |  |

To illustrate the present invention further, where the cooling load in the generator is less, the following data are set forth.

*Low cooling load*

|  | Regenerator Vessel 1 | Auxiliary Vessel 6 |
|---|---|---|
| Vessel Top Pressure | 200 p. s. i. g | 202 p. s. i. g. |
| Vessel Temperature | 1,150° F |  |
| Percentage of Regenerator Cooling Surface in Dense Phase. | 25 |  |
| Percentage of Regenerator Cooling Surface in Disperse Phase. | 75 |  |
| Overall Heat Transfer Coefficient for Cooling Surface in Dense Phase. | 120 B. t. u./hr.-sq. ft.-°F. |  |
| Overall Heat Transfer Coefficient for Cooling Surface in Disperse Phase. | 20 B. t. u./hr.-sq. ft.-°F. |  |
| Average Heat Transfer Coefficient for Total Fixed Cooling Surface. | 45 B. t. u./hr.-sq. ft.-°F. |  |
| Average Coolant Temperature | 350° F |  |
| Average ΔT | 800° F |  |
| Average Heat Transferred Per Sq. Ft. of Total Fixed Cooling Surface. | 36,000 B. t. u./hr |  |

It will be noted from the foregoing that a large difference in heat transfer between the cooling surfaces and the catalyst bed is effected when the degree of immersion of the cooling coils in the dense phase is varied. In other words, it will be noted from the foregoing data that when the coil is 75% immersed in the dense phase, the heat transfer rate was 76,000 B. t. u. per sq. ft. of cooling surface per hour, whereas, when merely 25% of the cooling surface was immersed in the dense phase, 36,000 B. t. u. were transferred per sq. ft. per hour. These results show the critical effect as represented by difference in heat transfer, depending on whether the cooling surfaces are immersed in the dense phase or are immersed in the dilute phase, which is superimposed on the dense phase.

Numerous modifications of the present invention may be made by those familiar with the art without departing from the spirit of the invention.

What is claimed is:

1. The method of controlling the temperature of a powdered catalyst which is circulated continuously between a hydroforming reaction zone and an oxidative regeneration zone which comprises continuously supplying hydroforming catalyst particles containing carbonaceous deposits to a dense fluidized bed of catalyst superimposed by a dilute phase in the regeneration zone, disposing a cooling means in said regeneration zone, which cooling means is at least partially submerged in the said dense fluidized bed of catalyst, treating the catalyst in the regeneration zone with an oxygen-containing gas to burn carbonaceous deposits therefrom, providing a dense, fluidized bed of powdered catalyst of the same composition as that in the hydroforming reaction zone-regeneration zone circulation system in a third zone which third zone is of substantially smaller size than said regeneration zone which third zone is in communication with the said regeneration zone, and varying the degree of submergence of the cooling means in the dense fluidized bed of catalyst in the regeneration zone responsive to temperature conditions prevailing in said bed by causing catalyst to flow between the regeneration zone and the said third zone, thereby varying the amount of heat removed from the catalyst undergoing regeneration thus controlling the temperature of the catalyst in said regeneration zone and maintaining the circulation rate of regenerated catalyst from the regenerator to the reactor at a substantially constant value.

2. The method set forth in claim 1 in which the catalyst is a VI group metal oxide carried on active alumina.

References Cited in the file of this patent

UNITED STATES PATENTS 2,602,771    Munday et al. _____ July 8, 1952
2,735,802    Jahnig _____ Feb. 21, 1956